United States Patent [19]

Vermette et al.

[11] 4,421,209
[45] Dec. 20, 1983

[54] LIFT APPARATUS

[75] Inventors: Howard H. Vermette; Andrew H. Daugherty, both of Hammond, Ind.

[73] Assignee: Vermette Machine Company, Inc., Hammond, Ind.

[21] Appl. No.: 342,653

[22] Filed: Jan. 25, 1982

[51] Int. Cl.³ .............................................. B66B 9/20
[52] U.S. Cl. .................................... 187/9 R; 187/11; 182/129
[58] Field of Search .......................... 187/11, 27, 9 R; 414/446, 607, 608, 652, 656; 182/63, 129 X; 74/505, 507; 254/344, 357, 276, 325, 375

[56] References Cited

U.S. PATENT DOCUMENTS

| | | | |
|---|---|---|---|
| 665,025 | 1/1901 | Long | 414/656 X |
| 1,165,698 | 12/1915 | Morrison | 414/652 |
| 1,870,067 | 8/1932 | Remde | 187/11 |
| 2,060,218 | 11/1936 | Kaltenbach | 414/656 |
| 2,928,501 | 3/1960 | Ramirez | 187/11 |
| 3,957,137 | 5/1976 | Vermette | 187/11 |

*Primary Examiner*—David A. Scherbel
*Assistant Examiner*—Russell D. Stormer
*Attorney, Agent, or Firm*—Walter Leuca

[57] ABSTRACT

A lift apparatus comprising a wheeled base and a post mounted upright on the base. A fork lift having a guide frame which straddles the post and provided with rollers to travel on the post. The post is comprised of a plurality of interchangeable post segments releasably connected end to end. A winch mounted on one of the interchangeable post segments and a cable connected thereto and to the fork lift is operable to raise and lower the fork lift. This one post segment carries a bar to engage the guide frame to pivot the fork lift to a position parallel to this post segment to provide a compact arrangement and maintain the cable taut when the lift is disassembled. The winch includes a narrow groove cable pulley or spool so that connecting the winch device centrally of the post segment positions the rotational plane of the pulley in the center of the post with the result that no side resultant forces will be produced by the cable and no bracing required. The wheeled base is provided with stair-climbing tracks, and centrally therebetween lugs are provided to support an outrigger leg to vertically stabilize the lift. An extension shelf for the fork lift is provided to augment the work surface of the lift and to increase the height reaching capabilities of the lift. The extension shelf may be removed completely from the fork lift or may remain as part of the fork lift and folded as a back support therefor.

17 Drawing Figures

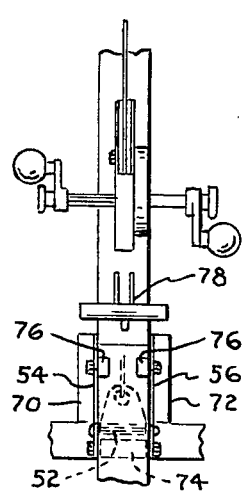
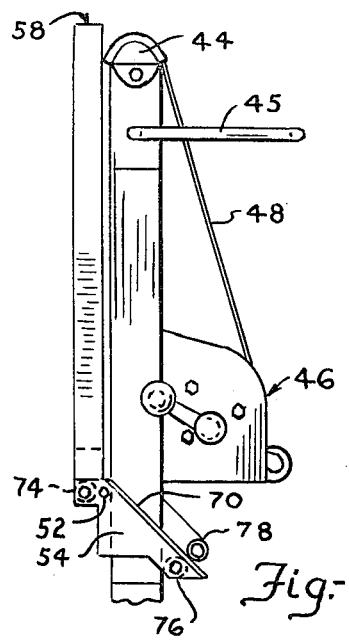
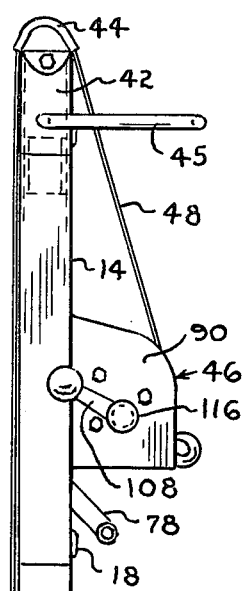
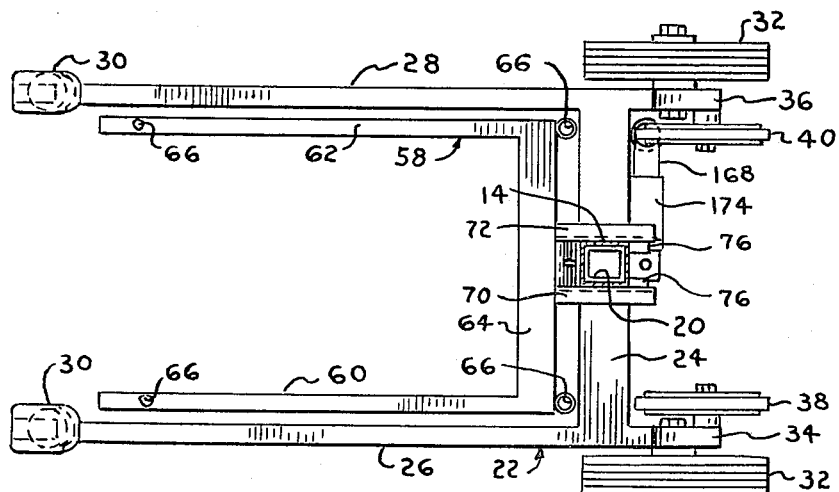
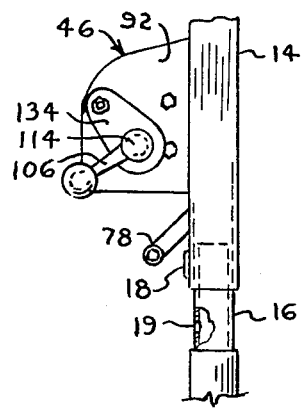
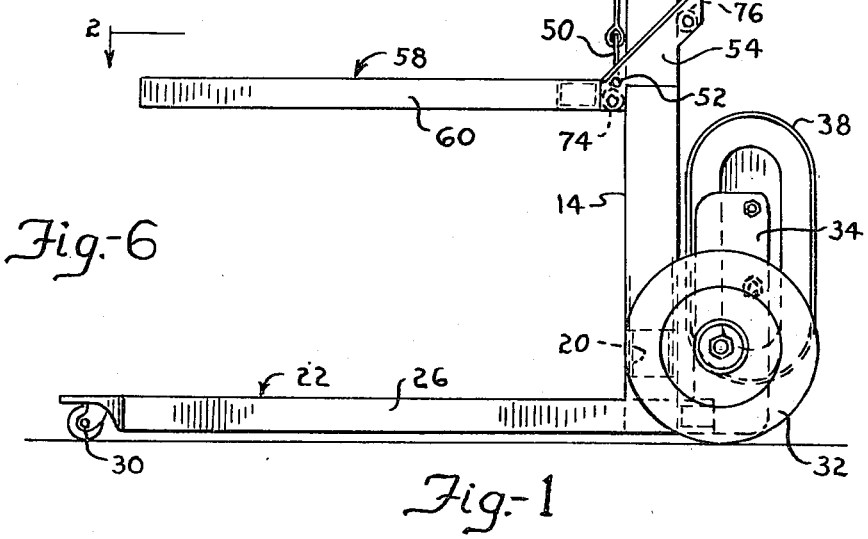

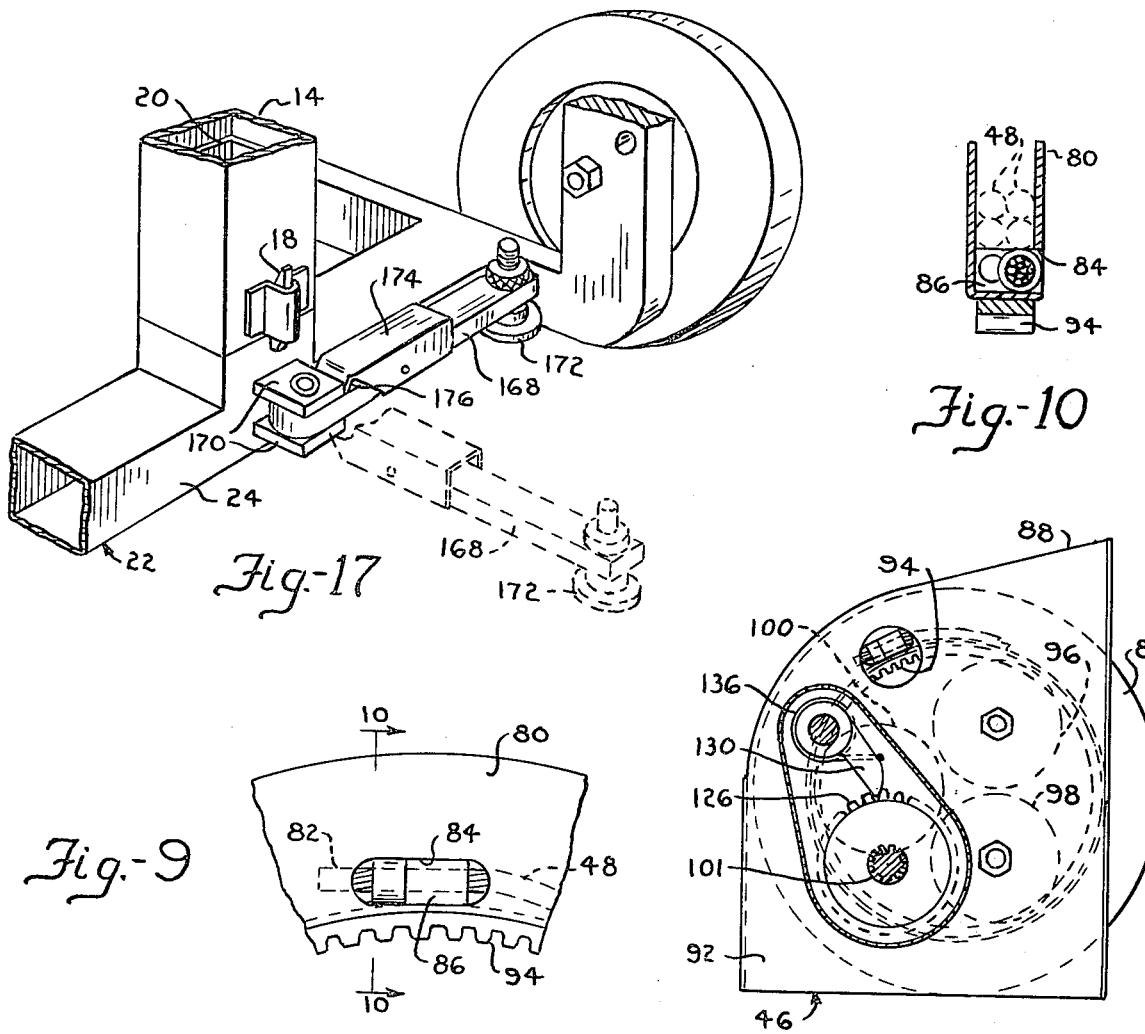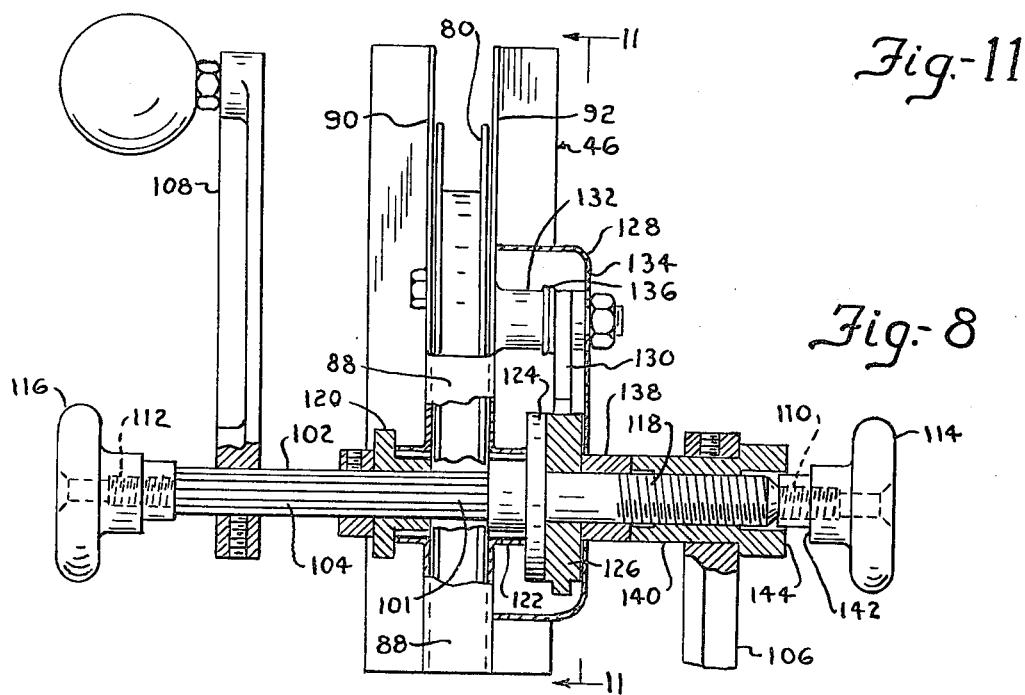

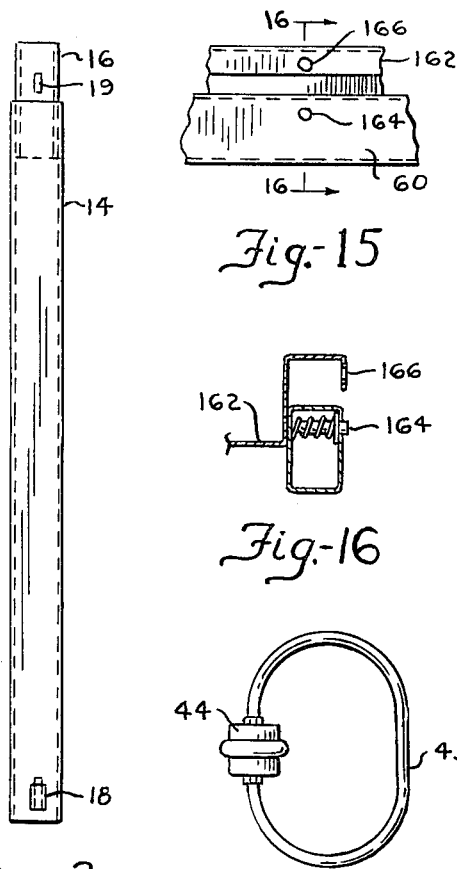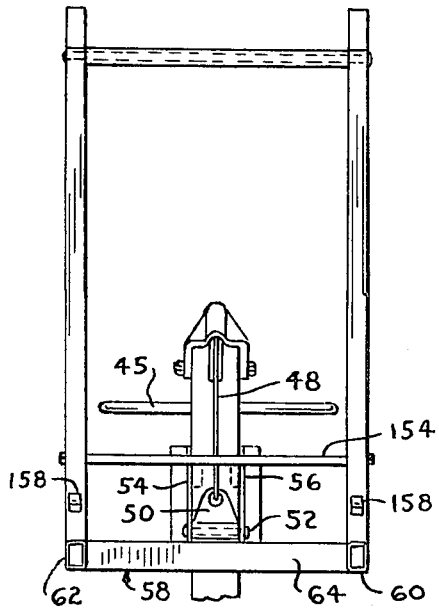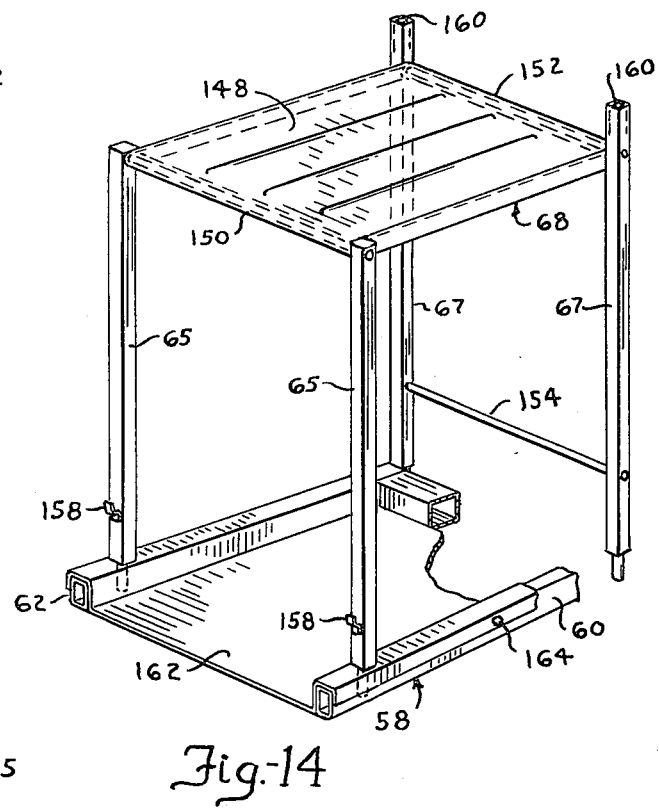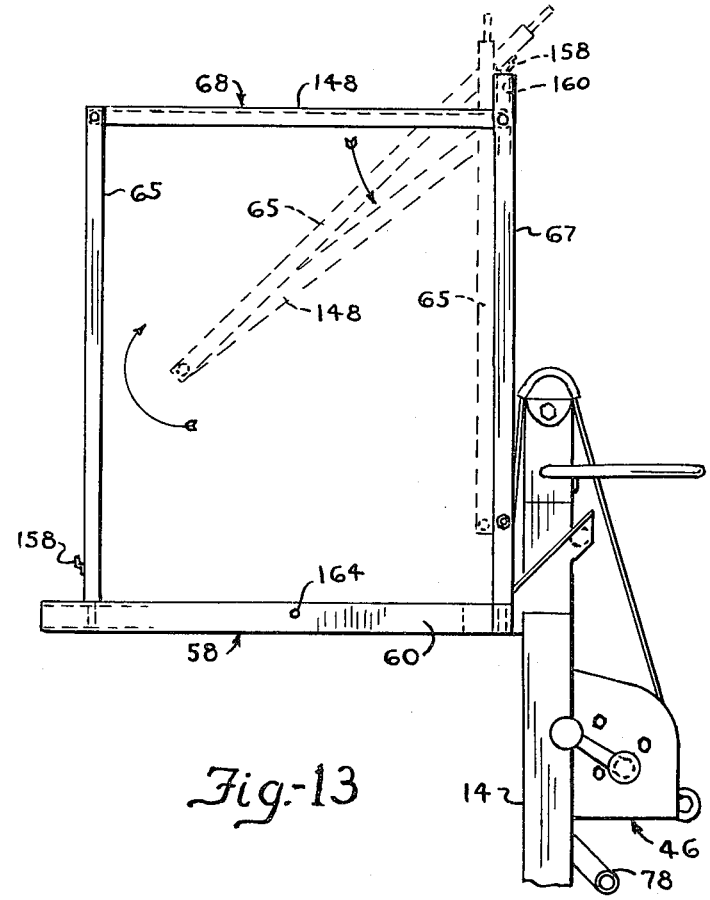

LIFT APPARATUS

BACKGROUND OF THE INVENTION

1. Field of the Invention

This invention relates generally to lift apparatus and more particularly to single post portable lift apparatus.

2. Description of the Prior Art

This invention is an improvement over the lift apparatus of the type disclosed in U.S. Pat. No. 4,131,181. Though prior art single post lifts are segmented to provide build-up capabilities, a principal disadvantage of prior art lifts is that the winch is mounted at a fixed location limiting the position from which the lift can be operated. Also, none of such prior art lifts provide an arrangement whereby the lift component members are compacted to a common post segment so that the cable connection between the winch pulley and the lift platform are maintained in a connected and taut condition when in dismantled form for transportation. A disadvantage of prior art lifts of this type is that the conventional cable winch drive allows uneven progression of spirals as the cable is wound on the winch drum. This action results in cable pile-up and cable damage.

SUMMARY OF THE INVENTION

This invention incorporates improvements which overcome the above disadvantages of prior art lifts. In particular, the post segment on which the winch is mounted is interchangeable with other post segments to position the winch at any desired operable height. This invention further provides novel features which enable provision of lift apparatus which is simple in structure, has few component parts, rendered easy to dismantle and assemble, adaptable for additional components to enlarge the function and capability of the lift, provides novel means to fold the lift table arms to a compact dimension for transportation and storage. This novel means includes an improved lift table-winch pulley post segment arrangement which provides a taut cable condition during the period of dismantlement and storage. This invention also includes a novel pulley-cable arrangement which eliminates any resultant side force which will tend to destabilize the vertical stance of the post. Also, improved features are included which prevent accidental tipping when the load is lifted to a position which otherwise would render the entire system unstable.

We accomplish the above by providing a wheeled base provided with a centrally positioned post stud on which are mounted a plurality of interchangeable post segments end to end to form the lift mast. Each of the post segments are connected to its supporting post by an end to end insert connection and locked together by spring biased quick release latch. One of the post segments has a winch pulley device which is permanently connected to it. The winch pulley device of this invention is a double hand crank handle, one crank handle being connected to the pulley drive shaft by spline means engagement, and the other end of the drive shaft cooperates with clutch elements including a ratchet wheel rotatable thereon. The other hand crank handle is effective to apply and release end thrust to engage and disengage the clutch and thereby serve as a control handle. The lift cable pulley of our design is in the form of an internal ring gear driven by an idler gear and pinion. The ring gear is positioned for axial rotation by fixed guide rollers within a pulley housing which is fixed to one of the post segments preferrably by weldments. A clutch ratchet wheel is provided with teeth which are engaged by a pawl pivoted on a stud fixed between the side wall of the winch housing and the side wall of the clutch housing. The pivoted pawl operates as a ratchet member against the ratchet wheel allowing unidirectional rotation thereof preventing unwinding of the cable when the clutch elements are engaged, and allowing unwinding of the cable pulley when the clutch elements are released. The spool or pulley sheave is only wide enough to accommodate a single or double width of cable so that connecting the winch device centrally of the post segment positions the rotational plane of the spool or pulley sheave in the center of the lift post whereby the cable will convolute upon itself uniformly thereby elminating the risk of cable pile up and damage. The winch drive post segment is further provided with an abutment member which engages a rearwardly extending part of a guide support as the fork lift table is raised causing the fork lift table to pivot to a position parallel with, adjacent to, and compacted against the winch device post segment. The winch device post segment and the cable is thereby locked in taut condition maintaining the fork lift table compacted against the post segment so that upon dismantling of the lift apparatus for transportation or storage, the cable does not become unravelled and damaged and may be reassembled and put into operation without the problems attendent to unravelled cables. The wheeled base is provided with means to attach stair climbing tracks, and centrally therebetween lugs provided to support a pivotally extending outrigger leg which may be locked in extendible position rearward of the wheeled base to vertically stabilize the mast preventing rearward tipping due to an imbalanced load lifted to a high elevation.

Other objects and advantages of our invention will become more apparent after a more careful study of the following detailed description which is to be read with reference to the accompanying drawings wherein is illustrated a preferred embodiment of my invention.

BRIEF DESCRIPTION OF THE DRAWINGS

FIG. 1 is a side view of the lift apparatus of this invention;

FIG. 2 is a top view thereof taken along lines 2—2 of FIG. 1;

FIG. 3 is a side view of a post segment;

FIG. 4 is a back end view of the post segment to which is connected a cable winch device and the abutment member showing the table guide support in fragment;

FIG. 5 is a side view of the post segment of this invention to which is connected the cable winch device and abutment member showing the guide support in operative relationship with the abutment member and the fork lift table pivoted to a compacted arrangement with the post segment;

FIG. 6 is an opposite side view of the post segment to which is connected the cable winch device showing the means by which it is removeably connected to another post segment;

FIG. 7 is a plan view of the top post segment;

FIG. 8 is a front view of the cable winch device in section and in fragment showing the component parts thereof;

FIG. 9 is a side view of a fragment of the pulley sheave showing the cable end anchor means in detail;

FIG. 10 is a cross-sectional view of the pulley sheave taken along lines 10—10 of FIG. 9;

FIG. 11 is a side view of the cable winch device showing the drive mechanism for the cable pulley sheave;

FIG. 12 is a front view of the lift table extension shown in operative relationship with the lift of this invention;

FIG. 13 is a side view of the lift table extension, the dotted lines thereof illustrating the folding process of the table extension to convert the same to a backside support for the lift table;

FIG. 14 is a perspective view of the lift table extension showing part of the lift table broken away;

FIG. 15 is a side view of a fragment of the side arm of the lift table and the channel shaped side of the table deck in exploded relationship;

FIG. 16 is a sectioned end view of lift table arm and channel shaped side of the table deck taken along lines 16—16 of FIG. 15; and FIG. 17 is a perspective view of the wheeled base of this invention in fragment showing the outrigger leg for stabilizing the lift.

DETAILED DESCRIPTION OF THE INVENTION

Referring now more particularly to the drawings, this invention, designated generally by numeral 10, comprises a single upright mast or post 12 longitudinally assembled by connecting a plurality of interchangeable post segments 14 end to end. The connection between post segments 14 may be accomplished in any manner which allows rapid assembly and disassembly. As best shown in FIGS. 3 and 6, a sleeve extension 16 is fixed to one end of each post segments 14, which sleeve is dimensionally reduced in cross section to telescopically fit in the tubular hollow end of the adjacent post segment. Sleeves 16 and the mate end of adjacent post segments 14 may be provided with groove and detent means, respectively, (not shown) to assure correct alignment. Spring bias latch 18 are appropriately provided at one end of the post segments adaptable to enter an aperture 19 provided in the mate end of the adjacent post segment sleeve extension 16 thereby engaging the post segments in locking relation. Upright post 12 is mounted on a base stud 20 which is formed upright on wheeled base 22. Base 22 is constructed to include a laterally extending member 24 which bridges longitudinally extending base members 26 and 28 supported on wheel means 30 and 32 provided at their respective distal ends. We prefer to mount rear wheel means 32 on stair climbing track frame 34 and 36 which form part of the rearward distal end of longitudinal base members 26 and 28 respectively. Accordingly, wheel means 30 and 32 provide means for horizontal transport, and stair climbing track means 38 and 40 provide means for vertical transport. Top post segment 42 is provided with a cable return sheave 44 and an oblong shaped handle 45 for manual gripping to maneuver the top portion of the upright mast 12 when necessary. One of segments 14 has fixed to it a winch device 46 which has novel features and when combined with a single post lift contributes to the stability of the present lift. With reference to FIGS. 1 and 12, the end of cable 48 is anchored to plate member 50 which is hingedly connected by means of pin 52 to spaced guide plates 54 and 56 connected to and extending rearwardly of fork lift table 58. Lift table 58 is comprised of spaced parallel arms 60 and 62 connected by laterally extending bar 64. Holes 66 are formed in the distal ends of spaced arms 60 and 62 (FIG. 2) adapted to receive and vertically support upright legs 65 and 67 of extension table 68 thereby providing double deck work surfaces as shown in FIGS. 12-14.

Spaced guide plates 54 and 56 extend rearwardly of lift table 58, connected to and centrally of laterally extending connecting bar 64. Spaced plates 54 and 56 extend rearwardly, straddling lift post 12 and are formed with forwardly facing inclined flanges 70 and 72. Rearwardly extending plates 54 and 56 overhang the back side of lift post 12. Journaled therebetween adjacent the bottom thereof is roller 74 which rollingly engages the front side of lift post 12. Also journaled between plates 54 and 56 adjacent the top ends thereof are rollers 76 which rollingly engage the back side of lift post 12 so that when assembled to lift post 12, plates 54 and 56 and rollers 74 and 76 journaled thereon function to embrace lift post 12 for guiding support and travel thereon. The rollers facilitate vertical movement on lift post 12 as lift cable 48 anchored to hinge plate 50 which is connected to plates 54 and 56, is wound or unwound on winch device 46. It will be noted that plate hinge pin 52 for anchoring cable 48 connected to spaced plates 54 and 56 above bottom roller 74 at the front side of lift post 12 and is spaced below rollers 76. Connected to the back side of lift post 12 is a T cross bar 78 positioned to extend rearwardly from the back side of lift post 12 just sufficiently to clear the rearwardly extending distal ends of inclined flanges 70 and 72 of spaced side plates 54 and 56 as lift table 58 is raised on post 12. T cross bar 78 is positioned spaced from the bottom end of post segment 14 to which is connected cable winch device 46 so that when lift table 58 initiates its embrace to travel on this post segment 14, the rearwardly extending distal ends of inclined flanges 70 and 72 are most adjacent and horizontally aligned with T cross bar 78. By manually tilting lift table 58 upwardly, inclined flanges 70 and 72 will pivot clockwise as viewed in FIG. 5. This pivoting movement will radially extend the distal ends of flanges 70 and 72 in the horizontal direction causing the ends to abuttingly engage the cross bar of T 78. Once engaged, further tilting of table 58 will cause it to pivot clockwise until arms 60 and 62 thereof are positioned parallel and in straddle relation to post segments 14 and 42. The purpose of this novel structure and arrangement of parts enumerated and described is to compactly fold lift table 58 against post segment 14 which carries winch device 46, and thereby maintain all of the moving lift components in connected relationship for convenience in handling (disassembly, assembly, transportation and storage) and maintaining the cable in taut condition between winch pulley device 46, pulley sheave 44 and lift table 58. Accordingly, top post segment 42 to which is connected to cable return pulley sheave 44 is formed short as possible for the above described handling purposes. Flexibility is increased by making top post segment 42 removeable and interchangeable with other post segments 14. It may be necessary to provide a lift post 12 of one or more post segments 14 over and above the winch device post segment 14. For this purpose, top post segment 42 may be removed from winch device post segment 14 and mounted onto the top of the uppermost post segment 14 while maintaining the winch device post segment 14 at the operators height. Top post segment 42 may remain connected to winch post segment 14 with the extension post segment 14 inserted below the winch post segment to raise the winch device 46 to ladder height when the operator is operating above floor level.

With reference to FIGS. 8–10, winch device 46 of this invention has several features which advantageously operate in combination with the single post type lift. One novel feature thereof being means for anchoring a lift cable to a pulley having a very narrow groove whereby only a double cable width pulley may be used to wind the lift cable thereby eliminating laterally acting resultant forces resulting from the pull of the cable as it spirals to and fro over the rotating prior art pulley drum. Another feature being means for controlling the descent of the lift table.

With reference to FIGS. 9 and 10, the preferred groove width of pulley 80 is a double cable width so that successive convolutions of cable 48 are layered alternately onto a previous wrap rather than spirally aside each other so that the pull on cable 48 has no significant laterally acting resultant force which would have a tendency to destabilize the vertical stance of lift post 12 which would be particularly sensitive with a tall lift post and a heavy load. This objective is obtained by anchoring cable end 82 in narrow groove pulley 80 of this invention, simply and securely, by forming a generally rectangular recess or aperture 84 in the side wall of pulley 80 adjacent the base thereof. A rectangular anchor member 86 having parallel bores longitudinally therethrough for receiving through one bore the end 82 of cable 48 and fixing the distal end thereof which extends beyond anchor member 86 in any convenient conventional manner known to the cable art. The other bore receives therethrough the return wrap of cable 48 completing the first convolution. Anchor member 86 is formed with a width dimension equal to extend flush with the outside surface of pulley 80 to the inside surface at the opposite side of the pulley. As shown in FIG. 10, one side of anchor member 86 extends through aperture 84 in the side wall of pulley 80 and thereby is fixed in abutment therewith. The construction shown and described provides a cable end anchor which has strength, provides cable securement, is simple and easy to assemble and construct, and allows for the provision of a pulley groove having the smallest width to cable diameter ratio. The cable anchor means of this invention allows for the connection and operation of cable pulley 80 within the narrow confines of the supporting structure of the drive and clutch means of the winch device enabling the provision of compactly designed winch 46 of this invention which may be securely mounted on a narrow support such as a post segment 14 without braces which extend to other components, and without sacrificing strength, power and efficiency of the winch operation.

As shown in FIGS. 8 and 11, winch device 46 comprises a housing 88 including side walls 90 and 92 having flanges extending through a slotted opening into the hollow of post segment 14 and therein welded to the interior of the post segment. This connecting construction of which housing 88 to post segment 14 may be done in any other convenient manner known to those skilled in the art. Cable pulley 80 is formed to include an internal ring gear 94 supported for rotation on a plurality of internally supported rollers 96, 98, and idler gear 100, the shafts of which are connected to side walls 90 and 92 in any convenient manner. Rollers 96 and 98 are idler rollers, and idler gear 100 is the drive gear, all of which are spaced approximately equidistant within internal ring gear 94 thereby providing concentrically rotatable securement for pulley member 80. Spline means 104 of horizontally disposed drive shaft 102 is part of the gear drive and at 101 is in gear meshing engagement with idler gear 100 which is in gear mesh with ring gear 94 of pulley 80 by which means the pulley is rotated. Also connected to spline means 104 of shaft 102 is crank handle 108 by which means, together with the assistance of opposing crank handle 106, winch device 46 of our invention is operated. Drive shaft 102 terminates with threaded ends 110 and 112. Threaded end 110 receives hand knob 114 and threaded end 112 receives hand knob 116. End 110 is threaded reverse of threads 118 formed on the body of shaft 102. For example, threads on end 110 are left handed threads and threads 118 on the body of shaft 102 are right handed threads for reasons which will become apparent. Drive pinion 101 is part of spline means 104 of shaft 102 between support bearings 120 and 122. Clutch plate 124 is fixed to shaft 102 and clutch ratchet wheel 126 is freely rotatable on the shaft, both being adjacently positioned for abutting clutch engagement and both contained within clutch housing 128. Clutch ratchet wheel 126 is formed with teeth circumferentially therearound for engaging pawl lever 130 which is pivotally supported on stud 132 extending between side wall 92 of housing 88 and side wall 134 of clutch housing 128. Spring 136 biases pawl lever 130 to engage the teeth on clutch ratchet wheel 126 and thereby operates as a ratchet mechanism permitting one way rotation when the clutch elements are engaged. Also mounted on shaft 102 in abutting engagement with clutch ratchet wheel 126 is freely rotatable spacer 138. Sleeve 140 is internally threaded to engage threads 118 formed on the body of shaft 102. Opposing control crank handle 106 is connected to sleeve 140 and manual rotation thereof functions to axially move clutch ratchet wheel 126 against clutch plate 124 to provide a driving connection, and reverse rotation thereof functions to move sleeve 140 on shaft 102 away from spacer 138 and thereby release clutch ratchet wheel 126 from its driving connection with clutch plate 124. When this occurs, pawl lever 130 is not effective to prevent reverse rotation of drive shaft 102 since clutch ratchet wheel 126, not being in driving connection with clutch plate 124, is mounted freely rotatable on shaft 102. With cable 48 supporting a load, manually rotating crank handle 106 in the reverse direction will result in counter-rotation of drive shaft 102 and pulley 80 and consequent unwinding of cable 48 and lowering of lift table 58. If crank handle 108 is manually held or restrained while drive shaft 102 is counter-rotating, sleeve member 140, being threadedly connected thereof will advance thereon against spacer 138 and against clutch ratchet wheel 126 causing it to abut against clutch plate 124 thereby effecting a clutch driving connection and stopping the lift table descent. Ratchet pawl lever 130 thereupon becoming effective to prevent counter-rotation when crank handles 106 and 108 are manually released. Hand knob 116 is threaded onto threaded end 112 of shaft 102 and serves to prevent unintended removal of crank handle 108 from its spline engagement with the shaft; and hand knob 114 is threaded onto left-hand threaded end 110 of shaft 102. Its main function is to serve as a lock to prevent unintended relase of clutch ratchet wheel 126 from clutch plate 124. Another important function of hand knob 114 is to closely control and measure the extent of descent of lift table 58. It is apparent that unscrewing hand knob 114 on threaded end 110 with space end 142 of knob 114 which otherwise would abut against outward end 144 of sleeve 140, a preselect axial distance from the end thereof, allowing crank handle 106 to unscrew sleeve 140 this same preselect distance so that the clutch ratchet wheel will not engage the clutch plate until the lift table descent above described will correspond to the preselect axial distance determined by spacing of hand knob 114. Accordingly, lift table descent may be controlled very closely by threadedly spaced hand knob 114 on threaded end 110 for the clutch release operation.

FIGS. 12-14 show extension table 68 which can be added to lift table 58 to provide either a double deck support to augment the work surface of the lift of this invention, or to increase the height reaching capabilities of the lift. Extension table 68 comprises a platform 148 hingedly connected at its front and back ends to cross bars 150 and 152 respectively. Cross bars 150 and 152 extend laterally between front and back upright legs 65 and 67 respectively. Upright leg parts 65 and 67 are fixed to cross bars 150 and 152 so that each of the leg pairs pivot in unison with their corresponding cross bars. This facilitates folding the legs against table platform 148 when not in use, or as shown in dotted lines in FIG. 13, when the table platform is folded and made a part of lift table 58 as a back support.

A brace bar 154 is provided laterally between back leg pair 67. Bar 154 serves to provide stability to extension table 68 by bracing against the top of post 42 when table 68 is elevated above post 42.

As referred to above, the folding of extension table 68 is illustrated in dotted lines in FIG. 13. Extension table 68 may be removed completely from lift table 58 by removing leg pairs 65 and 67 from holes 66 and folded for storage until further use. Extension table 68 may remain as part of lift table 58 and converted to a back support therefor by removing only forward legs 65 from their corresponding holes 66 and pivot them clockwise, as viewed in FIG. 13, while pivoting table component 148 counterclockwise until it is positioned between back legs 67. The bottom end of legs 65 are moved adjacent the top ends of legs 67 and connected together. I accomplish the connection by providing hook members 158 adjacent the bottom end of legs 65 so that when moved to the top of legs 67, hook members 158 are aligned to be inserted in holes 160 provided therein thereby fixedly securing the folded extension shelf 68 and converting the same to a back support for lift table 58.

FIGS. 14-16 further discloses an add-on tray 162 which is a plate having opposing sides thereof formed in the shape of channels to overlap lift table arms 60 and 62. One of the arms is provided with a spring biased plunger 164 which extends through hole 166 in the channel side of tray 162 making a plunger-detent type releaseable connection.

FIG. 17 illustrates the operation of outrigger leg 168 which is pivotly connected to wheeled base 22. Outrigger leg 168 is pivotly connected to rectangular lugs 170 at one end thereof, and carries an adjustably positioned pad 172 at the distal end thereof. Outrigger leg 168 is locked in a position parallel to laterally extending member 24 by latch means 174 when not in supportive use; and also locked in rearward extending position when in use to brace the lift as shown in dotted lines of FIG. 17. Latch 174 is preferably a channel shaped member pivotly connected to leg 168 and formed at its forward end with a downward bent lip 176 for engaging the lateral side or the distal side of top lug 170 to positionally lock leg 168 parallel to member 24 or in the extended stabilizing position. The top of latch 174 is spaced from leg 168 permitting pivoting movement thereof to disengaged lip 176 from its locking abutment with the side of lug 170 in order to permit pivotal movement of leg 168. Biasing means (not shown) is provided in the aforementioned space between the top of latch 174 and leg 168 to normally maintain latch 174 in locking engagement.

Based on the foregoing, it is believed that the construction, operation, objects and advantages of my present invention will be readily comprehended by persons skilled in the art, without further description. It is to be clearly understood, however, that various changes in the construction described above and illustrated in the drawings may be made without departing from the scope of the invention, it being intended that all matter contained in the description or shown in the drawings shall be interpreted as illustrative only and not in a limiting sense.

We claim:

1. A list apparatus which includes a base, a post mounted upright on said base, said post having a forward side, a back side and opposing lateral sides relative to said base, a cable return sheave mounted on said post, a winch device provided on said back side of said post, means on said post moveable along said post, said means having one end extending forward of said forward side of said post and an opposing other end at said back side of said post, a lift table supported at said one end of said means, said lift table extending horizontally from said forward side of said post, a cable connected at one end to said winch device and at the other end to said means and moveable over said cable return sheave for moving said means and said lift table along said post, wherein the improvement thereof comprises:

a cross bar connected to said post spaced from said back side thereof;

said means and said lift table being pivotable on said post from a horizontal position to a vertical position;

and said other end of said means formed to extend rearward of said back side of said post at an incline so as to clear said cross bar when said lift table extends horizontally from said post, and engage said cross bar at said incline when said lift table and said means are pivoted from the horizontal toward the vertical when said means is moved along said post adjacent said cross bar.

2. The lift apparatus of claim 1 wherein said post is further characterized as being comprised of a plurality of segments releasably connected together end to end, and said winch device and said cross bar being connected to one of said segments.

3. A lift apparatus which includes a base, a post mounted upright on said base, said post having a forward side, a back side and opposing lateral sides relative to said base, a cable return sheave mounted on said post, a winch device provided on said back side of said post, means on said post moveable along said post, one end of said means extending forward of said forward side of said post and the other end extending to said back side of said post, a lift table supported at said one end of said means, said lift table extending horizontally from said forward side of said post, a cable connected at one end thereof to said winch device and at the other end thereof to said means and moveable over said cable return sheave for moving said means and said lift table along said post, wherein the improvement thereof comprises:

a cross bar connected to said post spaced from said back side thereof;

said means and said lift table being pivotable on said post from a horizontal position to a vertical position; and said other end of said means formed to extend rearward of said back side of said post at an incline so as to clear said cross bar when said lift table extends horizontally from said post, and engage said cross bar at said incline when said lift table and said means are pivoted from the horizontal toward the vertical when said means is moved along said post adjacent said cross bar.

4. The lift apparatus of claim 3 wherein said post is further characterized as being comprised of a plurality of segments releasably connected together end to end and said winch device and said cross bar being connected to a common post segment.

5. A lift apparatus which includes a base, a post mounted upright on said base, said post having a forward side, a back side and opposing lateral sides relative to said base, a cable return sheave mounted on said post, a winch device provided on said back side of said post, means on said post moveable along said post, a lift table supported by said means on said post, said lift table extending horizontally from said forward side of said post, a cable connected at one end to said winch device and at the other end to said means and moveable over said cable return sheave for moving said means and said lift table along said post, wherein the improvement comprises:

a cross bar connected to said post spaced from said back side thereof;

said means on said post including spaced plate members, each thereof extending along an opposing lateral side of said post, a side of each of said plate members formed with an incline from one end to the other end;

one end of each of said spaced plate members connected to said lift table, the other end of each of said plate members projecting beyond said back side of said post;

roller means supported between said plate members and engaging the forward side of said post;

second roller means supported between said plate members and engaging the back side of said post;

a cable anchor member between said plate members at the forward side of said post for securing thereto the other end of said cable;

said lift table and said plate members being pivotable on said second roller means from a horizontal position to a vertical position; and said other end of said plate members formed to extend rearward of said back side of said post with said inclined sides so as to clear said cross bar when said lift table and said plate members extend horizontally from said post and engage said cross bar with said inclined sides when said lift table and said plate members are pivoted from the horizontal toward the vertical when said lift table and said plate members are moved along said post adjacent said cross bar.

6. The lift apparatus of claim 5 wherein said post is further characterized as being comprised of a plurality of segments releasably connected together end to end and said winch device and said cross bar being connected to a common post segment.

7. A lift apparatus which includes a base, a post mounted upright on said base, said post having a forward side, a back side and opposing lateral sides relative to said base, a cable return sheave mounted on said post, a winch device provided on said back side of post, a lift table supported on said posts, said lift table extending horizontally from said forward side of said post, a cable connected at one end to said winch device and at the other end to said lift table support and moveable over said cable return sheave for moving said lift table along said post, wherein the improvement thereof comprises:

a cross bar connected to said post spaced from said back side thereof;

spaced plate members extending along said opposing lateral sides of said post, each of said plate members formed with an inclined side from one end thereof to the other end thereof, said one end of said inclined side being connected to said lift table and the other end of said inclined side projecting beyond said back side of said post;

roller means supported between said plate members adjacent said one end thereof and rollable on said forward side of said post;

second roller means supported between said plate members adjacent said other end thereof and rollable on said back side of said post;

said lift table and said plate members being pivotable on said second roller means from a horizontal position to a vertical position; and said other end of said plate members formed to extend rearward of said back side of said post with said inclined sides so as to clear said cross bar when said lift table extends horizontally from said post, and engage said cross bar with said inclined sides when said lift table and said plate members are pivoted from the horizontal toward the vertical when said lift table and said plate members are moved along said post adjacent said cross bar.

8. The lift apparatus of claim 7 wherein said post is further characterized as being comprised of a plurality of segments releasably connected together end to end and said winch device and said cross bar being connected to a common post segment.

* * * * *